(12) United States Patent
Leith

(10) Patent No.: US 6,820,518 B2
(45) Date of Patent: Nov. 23, 2004

(54) CRANKSHAFT ASSEMBLY

(75) Inventor: Donald G. Leith, West Bloomfield, MI (US)

(73) Assignee: Panther Machine, Inc., Wixom, MA (US)

( * ) Notice: Subject to any disclaimer, the term of this patent is extended or adjusted under 35 U.S.C. 154(b) by 469 days.

(21) Appl. No.: 09/859,984

(22) Filed: May 17, 2001

(65) Prior Publication Data

US 2001/0032526 A1 Oct. 25, 2001

Related U.S. Application Data

(60) Continuation-in-part of application No. 09/533,917, filed on Mar. 23, 2000, now Pat. No. 6,318,443, which is a division of application No. 09/065,155, filed on Apr. 23, 1998, now Pat. No. 6,173,628.

(51) Int. Cl.[7] .............................. F16C 3/04; F16C 11/00
(52) U.S. Cl. ........................................... 74/603; 74/595
(58) Field of Search .......................... 74/595–598, 603, 74/579 R, 579 E; 29/888.08

(56) References Cited

U.S. PATENT DOCUMENTS

| | | | |
|---|---|---|---|
| 2,364,109 A | 12/1944 | Taylor | 29/6 |
| 4,191,238 A | 3/1980 | Pichl | 164/100 |
| 4,265,388 A | 5/1981 | Takahashi et al. | 228/135 |
| 4,319,498 A | 3/1982 | McWhorter | 74/595 |
| 4,382,390 A | 5/1983 | Jordan | 74/567 |
| 4,406,590 A | 9/1983 | Kessler | 417/360 |
| 4,493,226 A | 1/1985 | Andrione et al. | 74/598 |
| 4,494,286 A | 1/1985 | Kaufman | 29/156.5 A |
| 4,509,378 A * | 4/1985 | Brown | 74/44 |
| 4,597,365 A | 7/1986 | Madaffer | 123/90.6 |
| 4,641,546 A | 2/1987 | Mettler | 74/598 |
| 4,730,512 A * | 3/1988 | Ito et al. | 744/595 |
| 4,829,642 A | 5/1989 | Thomas et al. | 29/6 |
| 4,829,954 A | 5/1989 | Morgado | 123/193 P |
| 4,835,832 A | 6/1989 | Arnold et al. | 29/523 |
| 4,838,116 A | 6/1989 | Saito et al. | 74/595 |
| 4,881,427 A | 11/1989 | Yasutake | 74/603 |

(List continued on next page.)

FOREIGN PATENT DOCUMENTS

| | | | |
|---|---|---|---|
| DE | 364371 | 11/1922 | |
| DE | 422828 | 12/1925 | |
| DE | 542056 | 1/1932 | |
| DE | 663563 | 8/1938 | |
| DE | 822036 | 11/1951 | |
| DE | 891641 | 10/1953 | |
| DE | 1270893 | 6/1968 | |
| EP | 0 530 890 A1 | 3/1993 | F16C/3/10 |
| FR | 763668 | 5/1934 | |
| GB | 2 168 458 A | 6/1986 | |
| JP | 2-180308 | 7/1990 | |
| JP | 10-169638 * | 6/1998 | 74/595 |

*Primary Examiner*—Vinh T. Luong
(74) *Attorney, Agent, or Firm*—Gifford, Krass, Groh, Sprinkle, Anderson & Citkowski, P.C.

(57) ABSTRACT

A crankshaft assembly for an internal combustion engine having a one-piece elongated shaft adapted to rotate about a longitudinal axis. The shaft includes a radially offset portion between the ends of the shaft, and this radially offset portion is spaced axially inwardly from each end of the shaft. An elongated connecting rod having a one-piece annular bearing support at one end is secured to the shaft so that the annular bearing support is positioned around the shaft offset portion. A first counterweight is secured to the shaft adjacent one end of the shaft offset portion while a second counterweight is secured to the shaft adjacent the other end of the shaft offset portion. In an alternate embodiment, the crankshaft, crankpin and one counterweight are formed as a casting. A one-piece connecting rod is then slid onto the crankpin and a second counterweight is molded to the crankshaft on the side of the crankpin opposite from the cast counterweight.

17 Claims, 6 Drawing Sheets

U.S. PATENT DOCUMENTS

| | | | |
|---|---|---|---|
| 4,922,993 A | 5/1990 | Matsuo et al. | 164/104 |
| 5,038,847 A | 8/1991 | Donahue et al. | 164/112 |
| 5,088,345 A | 2/1992 | Kemmler et al. | 74/598 |
| 5,199,318 A * | 4/1993 | Hudson | 74/595 |
| 5,203,230 A * | 4/1993 | Distelrath | 74/595 |
| 5,207,120 A | 5/1993 | Arnold et al. | 74/595 |
| 5,293,684 A | 3/1994 | Fry | 29/888.08 |
| 5,495,885 A | 3/1996 | Fowlkes et al. | 164/98 |
| 5,737,976 A * | 4/1998 | Haman | 74/595 E |
| 5,857,915 A | 1/1999 | Leith | 464/179 |
| 5,983,752 A * | 11/1999 | Wahlstrom | 74/603 |
| 6,173,628 B1 | 1/2001 | Leith | 74/598 |
| 6,314,643 B1 * | 11/2001 | Leith | 29/888.08 |
| 6,382,298 B2 * | 5/2002 | Leith et al. | 164/98 |

\* cited by examiner

CRANKSHAFT ASSEMBLY

CROSS-REFERENCE TO RELATED APPLICATIONS

This is a continuation-in-part of U.S. patent application Ser. No. 09/533,917, filed Mar. 23, 2000, now U.S. Pat. No. 6,318,443 issued on Mar. 23, 2000 and entitled "Crankshaft Construction" which is a divisional of U.S. patent application Ser. No. 09/065,155 filed Apr. 23, 1998 now U.S. Pat. No. 6,173,628 issued on Apr. 23, 1998.

BACKGROUND OF THE INVENTION

I. Field of the Invention

The present invention relates to a crankshaft assembly of the type used in internal combustion engines.

II. Description of Related Art

There are many types of previously known crankshafts that are used in internal combustion engines. These crankshafts typically include an elongated shaft adapted to rotate about its longitudinal axis. The shaft includes a radially offset portion between the ends of the shaft, and this offset portion has an axis parallel to, but radially spaced from, the axis of the shaft and this offset portion forms a crankpin. A pair of counterweights are secured to the shaft so that one counterweight is provided at each end of the radially offset portion of the shaft. These counterweights include a portion which extends in a direction diametrically opposed from the radially offset portion of the shaft.

An elongated connecting rod includes an annular bearing support at one end. This annular bearing support is positioned around the crankpin while the opposite end of the connecting rod is secured to a piston by a piston pin.

There have been a number of previously known methods for manufacturing these previously known crankshafts. In one prior method, the entire crankshaft together with the counterweights is formed as a one-piece forging and this forging is then machined to form not only the main bearing surfaces for the crankshaft, but also the bearing surface on the crankpin. In order to connect the connecting rod to the crankpin, the connecting rod bearing support typically comprised a two-part construction. The first part included a semi-circular bearing support which was positioned around the bearing crankpin. A semi-circular connecting rod cap was then also positioned around the crankpin so that the crankpin was sandwiched in between the connecting rod and the cap. The cap was then secured to the connecting rod by bolts or other fasteners.

These previously known forged crankshafts are advantageous since the entire crankshaft including the crankpin is of a one-piece construction. As such, the forged crankshafts exhibit high strength and failure of the crankshaft through breakage of the crankshaft is a rare phenomenon. A still further advantage of these previously known crankshafts is that the crankshaft is serviceable, i.e. in the event of damage to the connecting rod, the connecting rod can be removed and replaced. There are, however, several disadvantages of these previously known forged crankshafts.

One disadvantage of these previously known forged crankshafts is that the crankshafts are relatively expensive to manufacture. This relatively high cost of manufacture for the forged crankshafts results not only from the cost of preparing the forged crankshaft, but also the subsequent machining of the forging to form the main bearing surfaces of the crankshaft as well as the bearing surface on the crankpin.

A still further disadvantage of these previously known forged crankshafts is that, since the connecting rod is secured to the crankpin by threaded fasteners extending through the cap, failure of the connecting rod and/or the connection of the connecting rod with the crankpin can occur. Such failure typically occurs by failure of the connection of the connecting rod cap to the connecting rod.

There have, however, been previously known multi-piece connecting rods in which the shaft, crankpin and counterweights are all formed as separate components. The separate components are then secured together, for example by pressing these components together, in order to form the crankshaft assembly. Typically, the crankpin and shaft are formed of a high strength steel whereas the counterweights are formed of a less expensive material, such as powdered metal.

In order to secure the components together to form the overall crankshaft assembly, the counterweights are typically press fit onto the crankpin as well as to the shaft.

One advantage of these previously known multi-piece crankshafts is that the connecting rod can be attached to the crankpin before the other components of the crankshaft assembly, i.e. the counterweights and shaft, are attached together. Consequently, with multi-piece crankshafts, the annular bearing support of the connecting rod can be of a one-piece construction which is merely positioned over the crankpin prior to securing the other components of the crankshaft assembly together. Utilization of a one-piece bearing support on the connecting rod thus eliminates not only the two-piece connecting rod and bearing cap assembly used with forged crankshaft assemblies, but also the threaded fasteners for securing the cap to the connecting rod. This, in turn, results in a lower cost construction for the connecting rod but also in which the connection between the connecting rod and the crankpin exhibits higher strength than the previously known two-part connecting rod assemblies due to its one-piece construction.

One disadvantage of these previously known multi-piece crankshaft assemblies, however, is that the overall crankshaft assembly exhibits a much lower strength against torsional forces and the like than the previously known forged crankshafts. In practice, the connection between the various components of the multi-piece connecting rod can become loose which may result in overall failure of the crankshaft assembly.

There has, however, been one previously known crankshaft assembly in which the crankshaft, together with the crankpin and counterweight, was of a one-piece construction. In this previously known crankshaft assembly, the crankshaft included only one single counterweight at one end of the crankpin. A one-piece connecting rod having a one-piece annular bearing support was then positioned over the end of the crankshaft opposite from the counterweight and moved until the annular bearing support of the connecting rod was positioned around the crankpin. The opening of the annular bearing support of the connecting rod was usually larger than the outside diameter of the crankpin in order to enable the connecting rod bearing support to be slid from one end of the crankshaft and onto the crankpin. However, when positioned on the crankpin, bearings, such as needle bearings, were inserted in between the connecting rod bearing support and the crankpin thus completing the rotary connection between the connecting rod and the crankpin.

This previously known crankshaft advantageously enjoyed the high strength of the previously known forged crankshaft assemblies as well as the advantage of the one-piece connecting rod bearing support of the previously known multi-piece crankshaft assemblies. However, a primary disadvantage of this previously known crankshaft is that the crankshaft could only include a single counterweight at one end of the crankpin. Otherwise, it would not be possible to slide the connecting rod bearing support over the end of the crankshaft and onto the crankpin.

SUMMARY OF THE PRESENT INVENTION

The present invention provides a crankshaft assembly which overcomes all of the above-mentioned disadvantages of the previously known crankshaft assemblies.

In brief, the crankshaft assembly of the present invention comprises an elongated one-piece shaft adapted to rotate about its longitudinal axis. This shaft has a radially offset portion between the ends of the shaft, and this radially offset portion forms the crankpin. As such, the axis of the crankpin is parallel to, but spaced from, the axis of the shaft.

An elongated connecting rod has a one-piece annular bearing support at one end of the rod. This annular bearing support is positioned around the crankpin by sliding the bearing support over one end of the shaft and onto the crankpin. Once the annular bearing support is positioned around the crankpin, a bearing assembly is inserted between the connecting rod bearing support and the crankpin in order to complete the rotatable connection between the connecting rod and the crankpin.

Although any conventional bearing assembly can be used, in the preferred embodiment of the invention, two half bearing shells are inserted in between the connecting rod bearing support and the crankpin. A pair of counterweights are secured to the crankshaft so that one counterweight is positioned at one end of the crankpin while the second counterweight is positioned at the other end of the crankpin. One counterweight is optionally secured to the shaft before the connecting rod bearing support is positioned over the crankpin whereas the second counterweight is secured to the shaft after the connecting rod bearing support is rotatably mounted to the crankpin by the bearing assembly. Optionally, however, both counterweights are secured to the shaft after the connecting rod is rotatably mounted to the crankpin.

Preferably, the first counterweight is formed by casting liquid metal, such as liquid zinc, onto the shaft. The second counterweight is preferably preformed in any conventional fashion, such as by a powdered metal component, and then press fit onto the shaft.

Since the shaft together with the pin is of a one-piece construction, preferably of high strength steel, the crankshaft assembly of the present invention enjoys the overall strength of the previously known forged crankshafts. Similarly, since the connecting rod is rotatably connected to the crankpin before at least one, and perhaps both, counterweights are secured to the shaft, a one-piece connecting rod with a one-piece annular bearing support can be utilized thus achieving the advantages of the previously known multi-piece crankshafts.

In a further embodiment of the present invention, a center guide assembly is provided between the connecting rod bearing support and the crankpin to limit movement of the connecting rod relative to the crankpin in the direction of the axis of the crankpin. This construction in turn enables both counterweights to be cast onto the crankshaft after the connecting rod is positioned over the crankpin.

In a still further embodiment, the crankshaft, crankpin and one counterweight are formed as a casting. A one-piece connecting rod is then slid onto the crankpin and a second counterweight is molded to the crankshaft on the side of the crankpin opposite from the cast counterweight.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 8:
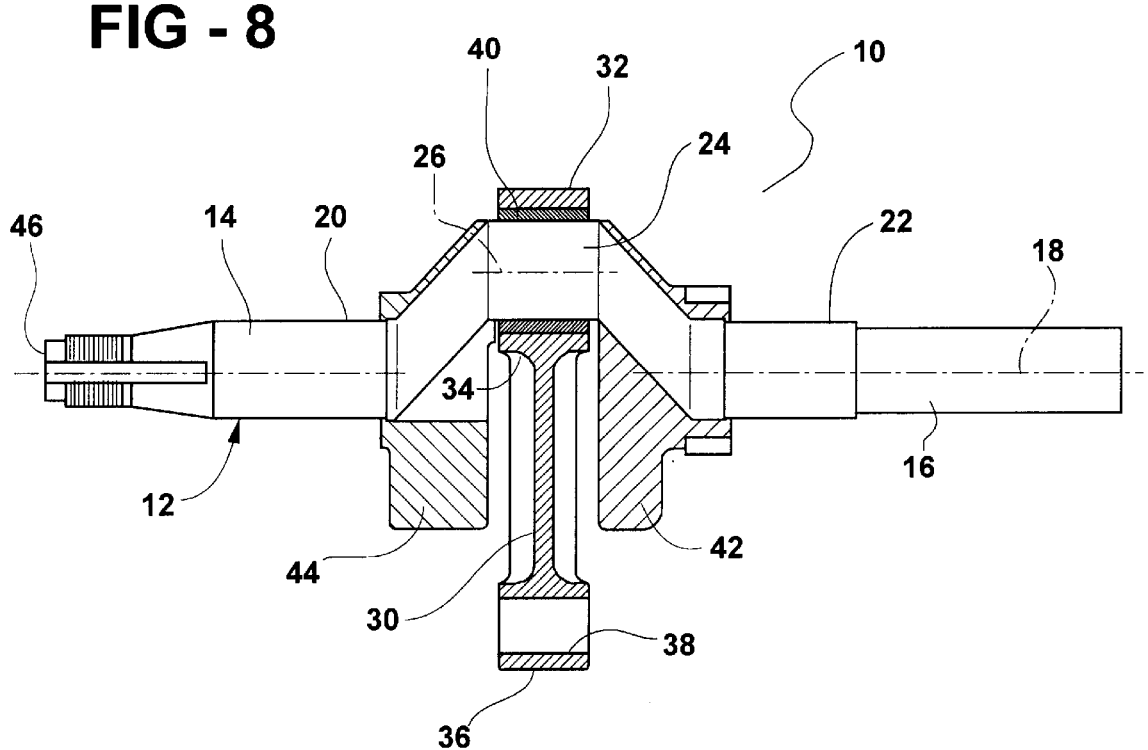
FIG. 8 is a perspective view illustrating the completed present invention.

With reference first to FIG. 8, a preferred embodiment of the crankshaft assembly 10 of the present invention is there shown and comprises an elongated shaft 12 having two aligned and axially spaced end portions 14 and 16. The shaft 12 is adapted to rotate about its longitudinal axis 18 and includes machined main bearing surfaces 20 and 22 on the end portions 14 and 16, respectively, for rotatably mounting the shaft 12 to an engine or compressor crankcase (not shown).

The shaft 12 includes a radially offset portion between the end portions 14 and 16. This radially offset portion forms a crankpin 24 for the crankshaft assembly 10. As such, the crankpin 24 includes an axis 26 which is parallel to, but radially offset from, the axis 18 of the shaft 12.

An elongated connecting rod 30 includes an annular one-piece bearing support 32 at one end 34. A throughbore 38 is formed through the opposite end 36 of the connecting rod 30 for attaching the end 36 of the connecting rod 30 to a piston (not shown) by any conventional means, such as a piston pin (not shown).

Figure 6:
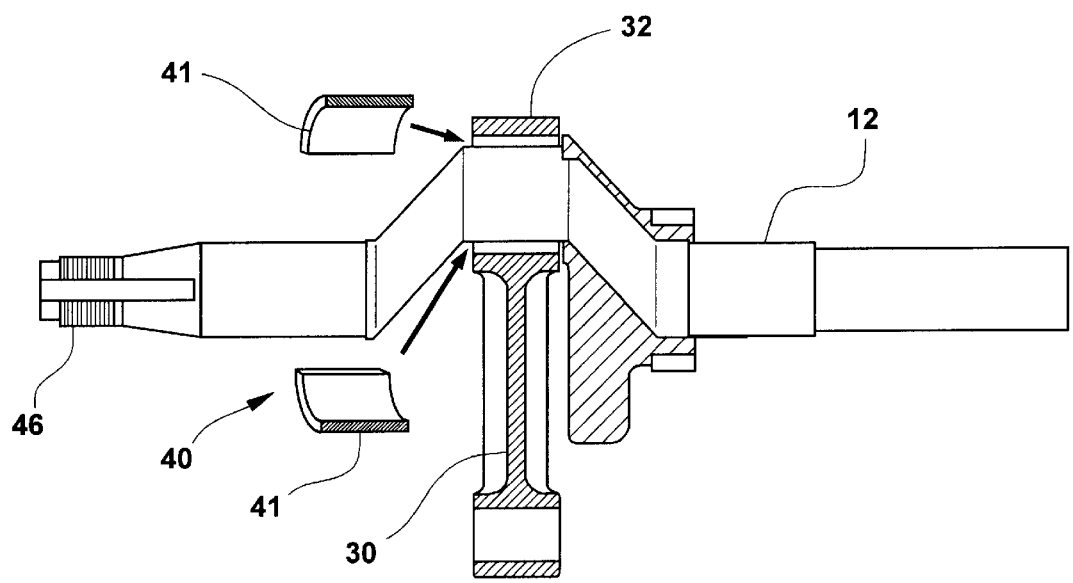

The inside diameter of the annular bearing support 32 is larger in diameter than the outside diameter of the crankpin 24 for a reason to be subsequently described. In order to rotatably mount the connecting rod bearing support 32 to the crankpin 24, a bearing assembly 40 is sandwiched in between the connecting rod bearing support 32 and the crankpin 24. The bearing assembly 40 can be of any conventional construction, but preferably comprises a pair of semi-circular bearing shells 41 (FIG. 6).

Still referring to FIG. 8, the crankshaft assembly 10 includes a first counterweight 42 at one end of the crankpin 24 and, similarly, a second counterweight 44 at the opposite end of the crankpin 24. Both counterweights 42 and 44 include a larger mass portion which protrudes outwardly from the shaft 12 in the direction opposite from the crankpin 24.

Figure 1:
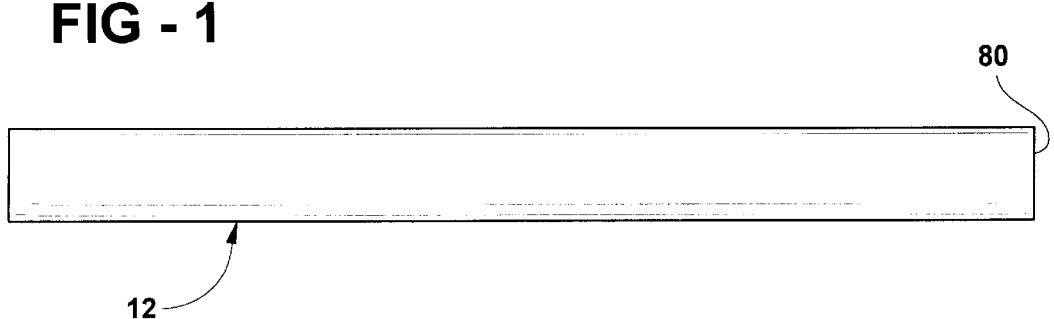
FIGS. 1–7 are side diagrammatic views illustrating the manufacture of a preferred embodiment of the invention.
Figure 2:
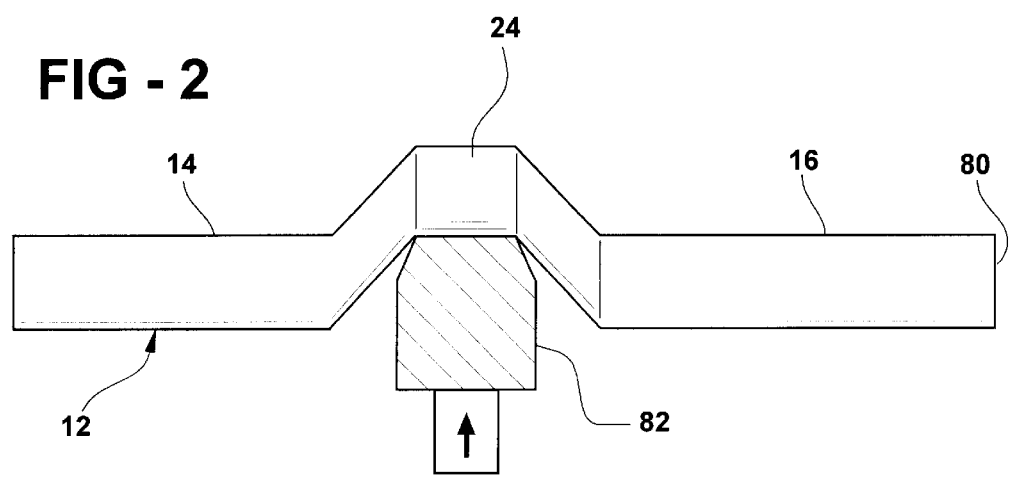
Figure 3:
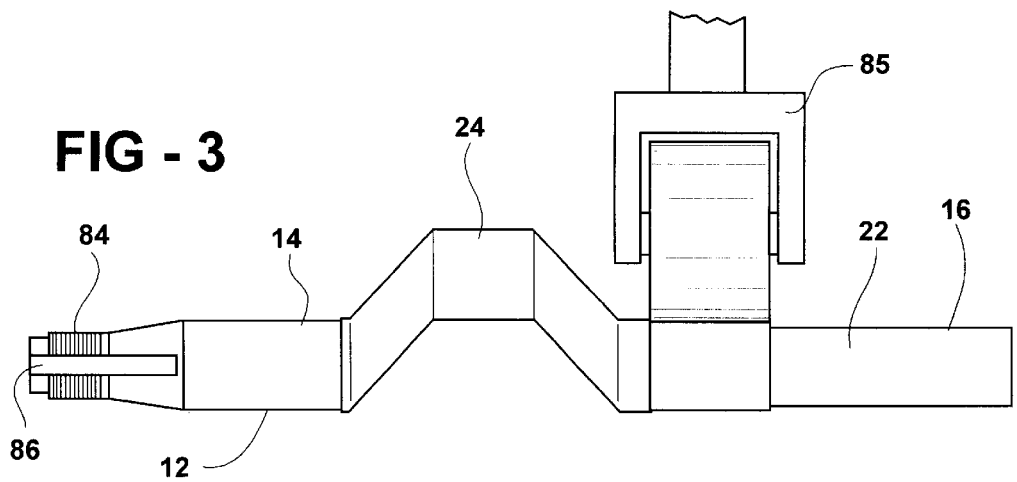

With reference now to FIGS. 1–7, the manufacture of the crankshaft assembly 10 will be now described. As shown in FIGS. 1 and 2, the shaft 12 and crankpin 24 are formed by cold forming an elongated metal rod 80 (FIG. 1) preferably constructed of a high strength material as shown in FIG. 2. As shown in FIG. 2, a ram 82 deforms the rod 80 to form the radially offset crankpin 24. Since the end portions 14 and 16 of the shaft 12 as well as the crankpin 24 are of a one-piece construction, the overall shaft 12 enjoys a high strength construction.

After the metal rod has been formed by cold forming to form the crankpin 24 as shown in FIG. 2, the shaft 12 and crankpin 24 are machined as shown diagrammatically at 84 in any conventional fashion, such as by turning, grinding or both, to form the outer bearing surfaces 20 and 22 on the shaft end portions 14 and 16 as well as the outer bearing surface on the crankpin 24. Other machining is optionally performed on the shaft to create, e.g., threads 84 or slots 86.

Figure 4:
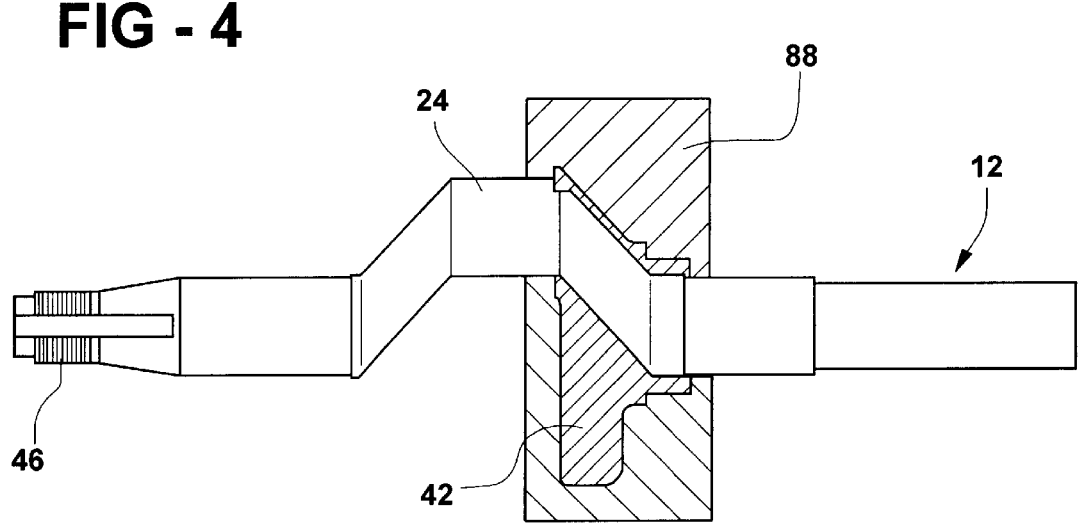

With reference now to FIG. 4, after the shaft 12 has been cold formed and machined, the first counterweight 42 is secured to the shaft 12 so that the counterweight 42 is positioned at one end of the crankpin 24. The counterweight 42 is preferably manufactured by casting liquid metal into a mold 88 disposed over the shaft 12. Alternatively, the counterweight 42 can be preformed, e.g., from powdered metal, and then press fit onto the shaft 12.

Figure 5:
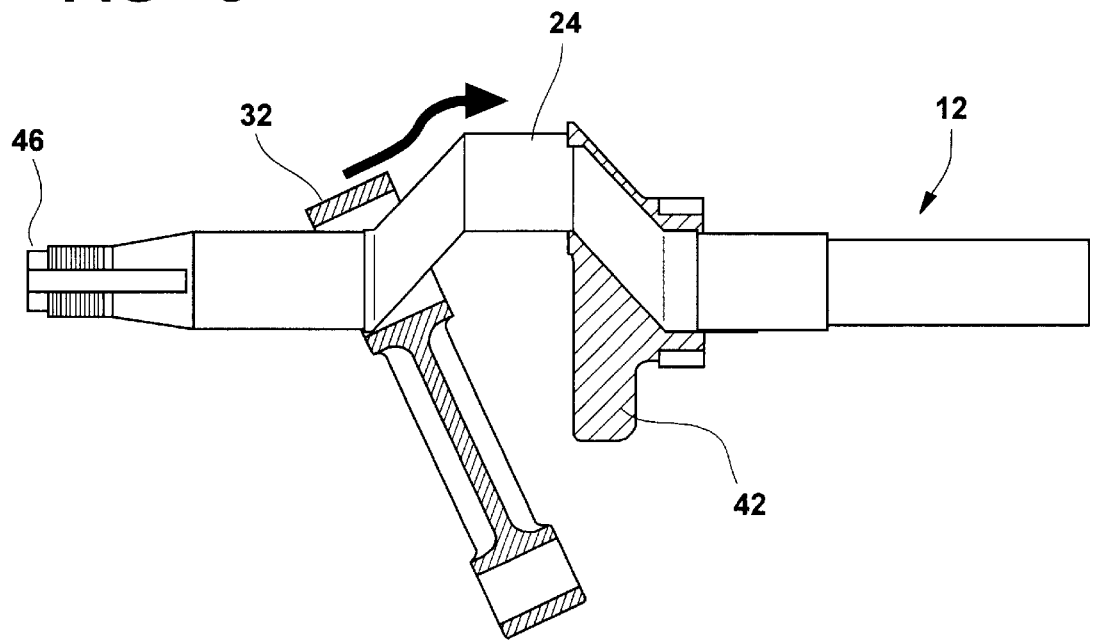

With reference now to FIG. 5, after the counterweight 42 has been attached to the shaft 12, the one-piece connecting rod annular support 32 is slid over the end 46 of the shaft 12 until the connecting rod bearing support 32 is positioned around the crankpin 24 as shown in FIG. 6. In order to facilitate the insertion of the connecting rod bearing support 32 over the shaft 12 and onto the crankpin 24, the inside diameter of the bearing support 32 is preferably larger than the outside diameter of the crankpin. In order to eliminate any radial movement or mechanical play between the bearing support 32 and the crankpin, the bearing assembly 40, such as the bearing shells 41, is then inserted in between the connecting rod bearing support 32 and the crankpin 24 as shown in FIG. 6. Upon insertion of the bearing assembly 40 between the bearing support 32 and crankpin 24, the rotational connection between the connecting rod 30 and the shaft 12 is completed.

Although the first counterweight 42 is preferably secured to the shaft 12 before the connecting rod 30 is rotatably connected to the crankpin 24, optionally the bearing support 32 of the connecting rod 30 is rotatably mounted to the crankpin 24 and the first counterweight 42 then secured to the shaft 12 (FIG. 3B).

Figure 7:
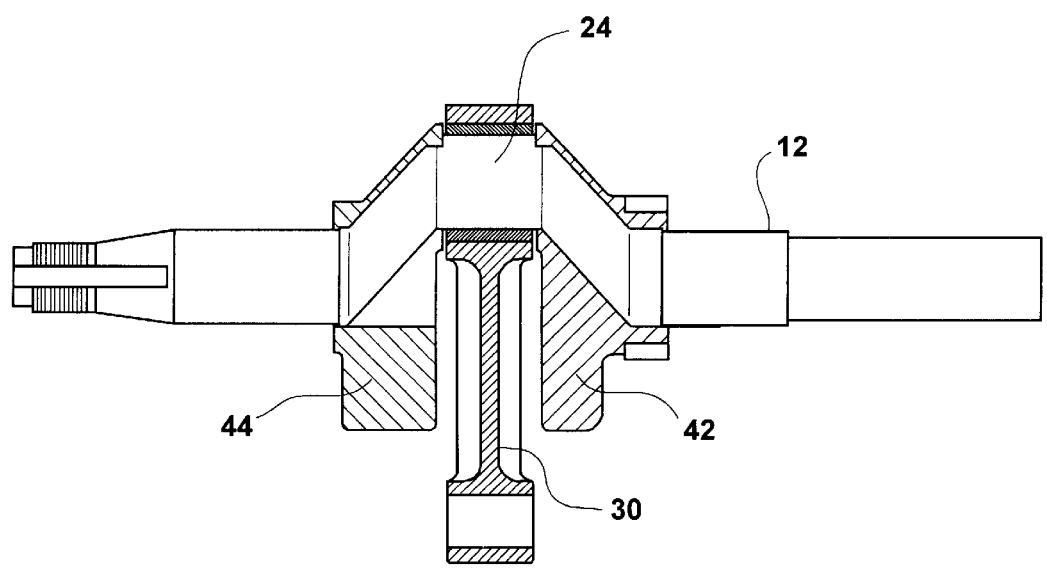

With reference now to FIG. 7, after the connecting rod 30 is rotatably mounted to the crankpin 24, the second counterweight 44 is secured to the shaft 12. Preferably, the second counterweight 44 is separately constructed, e.g. from powdered metal construction, and is secured to the shaft 12 by press fitting the counterweight 44 onto the shaft 12 in any conventional fashion. Alternatively, the second counterweight 44 is cast onto the shaft 12 in the same fashion as the first counterweight 42. In either case, the construction of the crankshaft assembly is completed.

For some crankshafts, it is necessary to eliminate axial movement between the connecting rod bearing support 32 and the crankpin 24. Typically, the sides of the counterweights 42 and 44 are used to center the bearing support 32 onto the crankpin 24. In this event, it is not possible to cast the second counterweight 44 onto the shaft 12 since there is insufficient area on the crankpin 24 for the mold to seal against during the casting operation.

Figure 9:
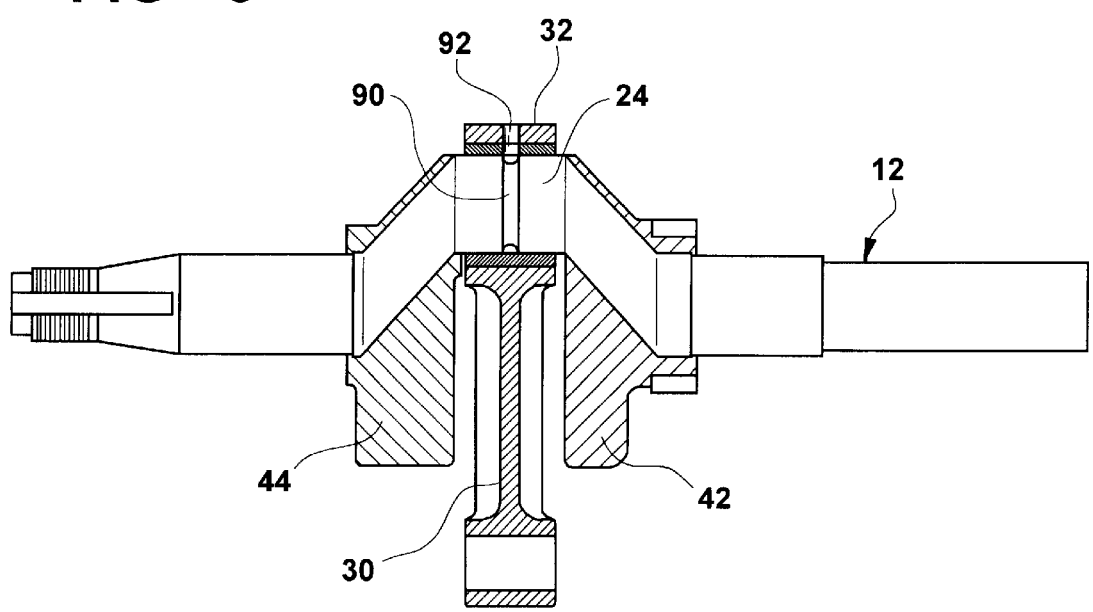
FIG. 9 is a longitudinal sectional view similar to FIG. 7, but illustrating a further preferred embodiment of the present invention.

With reference then to FIG. 9, a further embodiment of the present invention is shown in which each counterweight 42 and 44 are cast onto the shaft 12 after the connecting rod 30 is assembled onto the crankpin 24. Preferably, both counterweights 42 and 44 are cast at the same time. In order to eliminate axial movement of the connecting rod bearing support 32 along the crankpin 24, a circumferential guide channel 90 is machined around the crankpin 24. A guide pin 92 is then secured to the bearing support 32 so that the guide pin 92 extends into the guide channel 90 thereby securing the connecting rod 30 to the crankpin 24 against axial movement. The guide pin 92 and guide channel 90 form a means for limiting axial movement of the bearing support 32 relative to the crankpin 24.

Other conventional means may be used to secure the connecting rod to the crankpin 24 against axial movement. For example, a lock ring on each end of the bearing support 32 may alternatively be used.

Figure 10A:
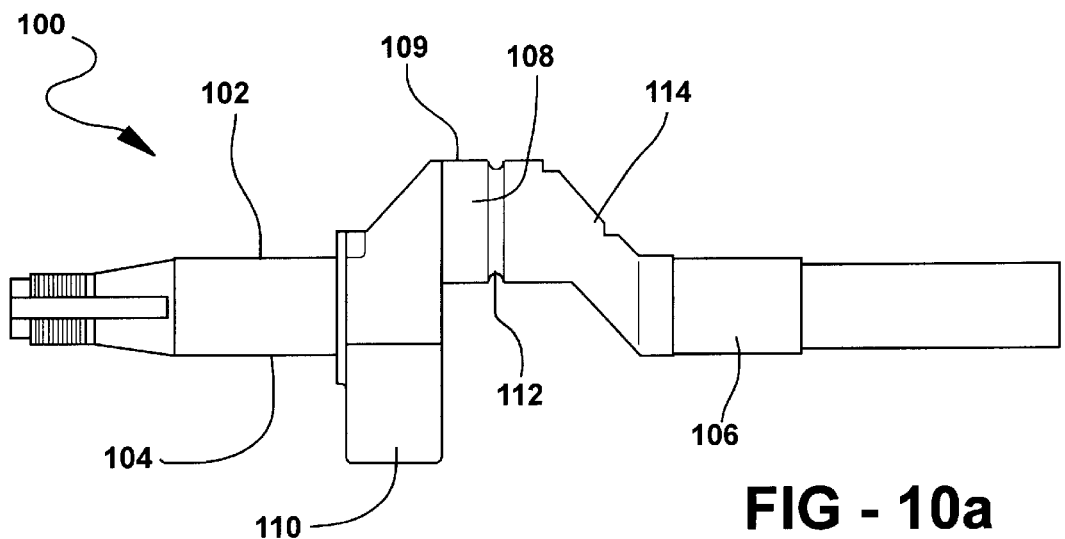
FIGS. 10a–10c are side assembly views illustrating a still further embodiment of the invention.
Figure 10B:
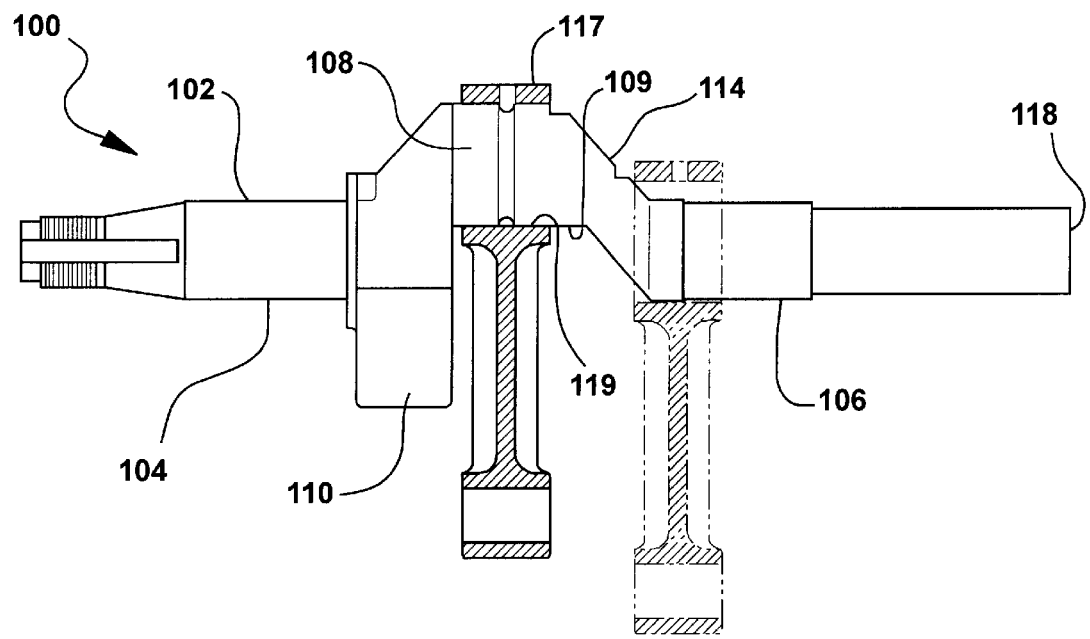
Figure 10C:
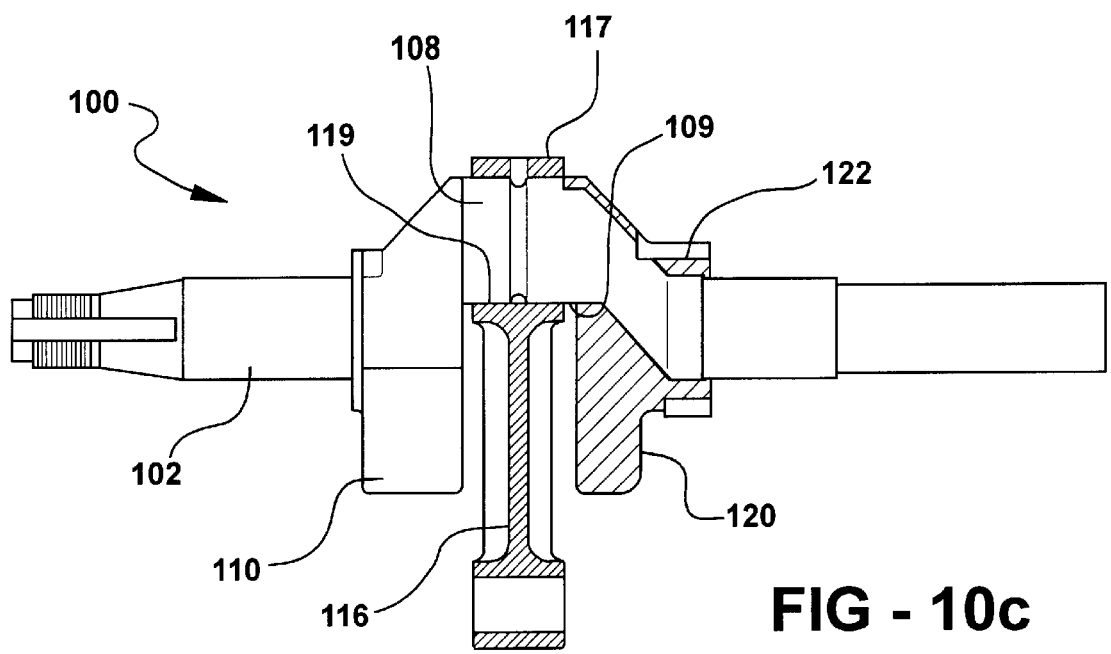

With reference now to FIGS. 10a–10c, a still further preferred embodiment of a crankshaft assembly 100 is shown. As shown in FIG. 10a, the crankshaft assembly 100 includes a main crankshaft 102 which is formed by casting. The crankshaft 102 includes two axially spaced main bearing surfaces 104 and 106 as well as a crankpin 108 having an outer bearing surface 109 parallel to but radially offset from the main bearing surfaces 104 and 106. A counterweight 110 is also integrally formed with the crankshaft 102 at one end of the crankpin 108 so that the shaft 102, counterweight 110 and crankpin 108 are of a one-piece construction.

Still referring to FIG. 10a, a channel 112 is formed circumferentially around the crankpin 108 for a reason to be subsequently described. Additionally, a portion 114 of the crankshaft 102 extending between the bearing surface 106 and the crankpin 108 is of a reduced cross-sectional area, also for a reason to be subsequently described. Furthermore, the bearing surfaces 104 and 106 as well as the crankpin bearing surface 109 are machined using conventional methods.

With reference now particularly to FIG. 10b, after the bearing surfaces 104 and 106 as well as the crankpin surface 109 have been fully machined, a one-piece connecting rod 116 having a bearing 117 with an inner bearing surface 119 is then slid onto the connecting pin 108 from one end 118 of the crankshaft 102, over the reduced area portion 114 of the crankshaft and onto the crankpin 108 so that the crankpin surface 109 and connecting rod bearing surface 119 abut against each other. It will, of course, be understood that the reduced area portion 114 of the crankshaft 102 is dimensioned to enable the bearing 117 of the one-piece connecting rod 116 to be slid from the position shown in phantom line in FIG. 10b and to the position shown in solid line in FIG. 10b where the connecting rod 116 is positioned around the crankpin 108.

With reference now to FIG. 10b, after the bearing 117 of the connecting rod 116 is positioned over the crankpin 108, a second counterweight 120 is molded onto the crankshaft 102 on the side of the crankpin 108 opposite from the counterweight 110. Consequently, the connecting rod bearing 117 is sandwiched in between the counterweights 110 and 120. Additionally, a gear ring 122 may also be integrally cast with the counterweight 120 if desired.

Figure 11:
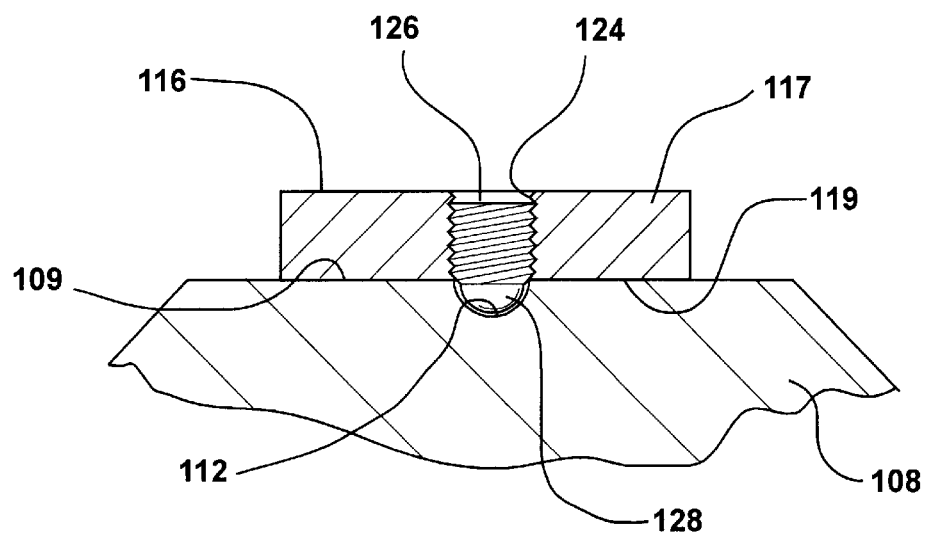
FIG. 11 is an enlarged fragmentary sectional view of a portion of the embodiment of FIGS. 10a–10c.

With reference now to FIG. 11, in some instances, it is necessary to constrain the connecting rod 116 against axial movement relative to the axis of the crankpin 108. In this event, a radially extending bore 124 is formed through the connecting rod bearing 117 so that the bore 124 registers with the annular groove 112 formed in the crankpin 108. A guide 126 is then secured within the connecting rod bore 124 so that a portion 128 of the guide 126 is positioned within the channel 112 thus locking the connecting rod 116 against axial movement relative to the crankpin 108. Any conventional means, such as a threaded connection as illustrated in FIG. 11, may be used to secure the guide 126 to the connecting rod 116.

From the foregoing, it can be seen that the crankshaft assembly 10 of the present invention achieves many advantages over the previously known crankshaft assemblies. In particular, since the shaft 12 together with the crankpin 24 is of a one-piece construction, preferably of high strength steel, the crankshaft assembly of the present invention enjoys the high strength and high durability of the previously known forged crankshaft construction.

Unlike the previously known forged crankshaft construction, however, a connecting rod having a one-piece annular bearing support for securing the connecting rod to the crankpin is used thus eliminating the previously known disadvantages of the two-piece connection between the connecting rod and the crankpin. As such, the connection between the connecting rod and the crankshaft is not only less expensive than the previously known two-piece connection with the connecting rod and the crankpin, but also stronger and less prone to failure than the previously known two-piece connecting rod constructions.

A still further advantage of the present invention is that, unlike the multi-piece crankshaft constructions, the crankshaft of the present invention is serviceable, i.e., if necessary, the counterweight 44 can be removed from the crankshaft, the connecting rod or its bearing assembly repaired or replaced, and the counterweight 44 reattached to the shaft 18.

Having described my invention, however, many modifications thereto will become apparent to those skilled in the art to which it pertains without deviation from the spirit of the invention as defined by the scope of the appended claims.

I claim:

1. A crankshaft assembly comprising:
   a one-piece elongated shaft adapted to rotate about a longitudinal axis, said shaft having a crankpin radially offset from said axis of said shaft, said crankpin being spaced axially inwardly from each end of said shaft,
   an elongated connecting rod having a one-piece annular bearing support at one end, said annular bearing support being positioned around said crankpin,
   a first counterweight being secured to said shaft adjacent one end of said crankpin, and
   a second counterweight being secured to said shaft adjacent the other end of said crankpin.

2. The invention as defined in claim 1 and comprising a bearing assembly sandwiched between said connecting rod bearing support and said crankpin.

3. The invention as defined in claim 2 wherein said bearing assembly comprises two half shells.

4. The invention as defined in claim 1 wherein said first counterweight is formed by casting molten metal onto said shaft.

5. The invention as defined in claim 1 wherein said second counterweight is secured to said shaft by press fitting said second counterweight onto said shaft.

6. The invention as defined in claim 1 and comprising means for limiting axial movement of said bearing support relative to said crankpin.

7. A crankshaft assembly comprising:
   a one-piece elongated shaft adapted to rotate about a longitudinal axis, said shaft having a crankpin radially offset from said axis of said shaft, said crankpin being spaced axially inwardly from each end of said shaft,
   an elongated connecting rod having a one-piece annular bearing support at one end, said annular bearing support being positioned around said crankpin by sliding said one-piece annular bearing support over one end of said shaft and onto said crankpin,
   a first counterweight being secured to said shaft adjacent one end of said crankpin, and
   a second counterweight being secured to said shaft adjacent the other end of said crankpin after said connecting rod bearing support is positioned around said crankpin.

8. The invention as defined in claim 7 and comprising a bearing assembly sandwiched between said connecting rod bearing support and said crankpin.

9. The invention as defined in claim 8 wherein said bearing assembly comprises two half shells.

10. The invention as defined in claim 7 wherein said first counterweight is formed by casting molten metal onto said shaft.

11. The invention as defined in claim 7 wherein said second counterweight is secured to said shaft by press fitting said second counterweight onto said shaft.

12. The invention as defined in claim 7 and comprising means for limiting axial movement of said bearing support relative to said crankpin.

13. A crankshaft assembly comprising:
    a one-piece elongated shaft adapted to rotate about a longitudinal axis, said shaft having a crankpin with an outer bearing surface radially offset from said axis of said shaft, said crankpin being spaced axially inwardly from each end of said shaft, said crankshaft having a first counterweight positioned adjacent one end of said crankpin, said shaft and said counterweight being of a one-piece construction,
    an elongated connecting rod having a one-piece annular bearing with a bearing surface at one end, said annular bearing being positioned around said crankpin by sliding said one-piece annular bearing over an end of said shaft opposite from said first counterweight and onto said crankpin so that said connecting rod bearing surface abuts against said crankpin bearing surface, and
    a second counterweight being secured to said shaft adjacent the other end of said crankpin after said connecting rod bearing is positioned around said crankpin.

14. The invention as defined in claim 13 wherein said second counterweight is formed by casting molten metal onto said shaft.

15. The invention as defined in claim 13 and comprising means for limiting axial movement of said bearing support relative to said crankpin.

16. The invention as defined in claim 15 wherein said crankpin includes a circumferentially extending channel and wherein said limiting means comprises a guide secured to said connecting rod, said guide having a portion extending into said channel.

17. The invention as defined in claim 15 wherein said shaft has a reduced cross-sectional area portion extending between the other end of said crankpin and an end of said shaft, said reduced area portion of said shaft having a cross-sectional area less than a cross-sectional area of said connecting rod bearing.

* * * * *